June 23, 1931. W. DYRSSEN 1,811,459
REGENERATIVE HEATING SYSTEM
Filed May 1, 1928  3 Sheets-Sheet 2

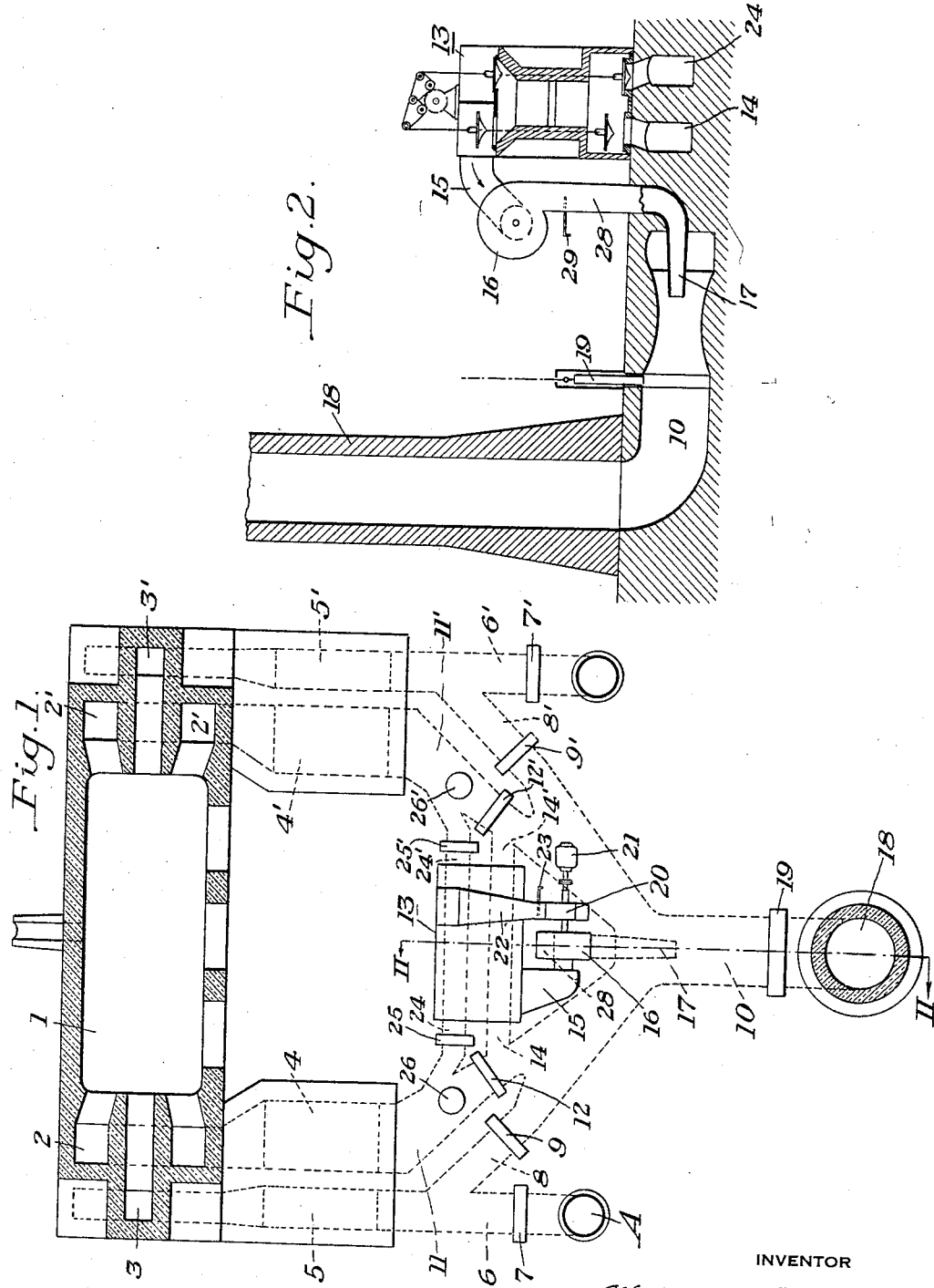

INVENTOR
Waldemar Dyrssen

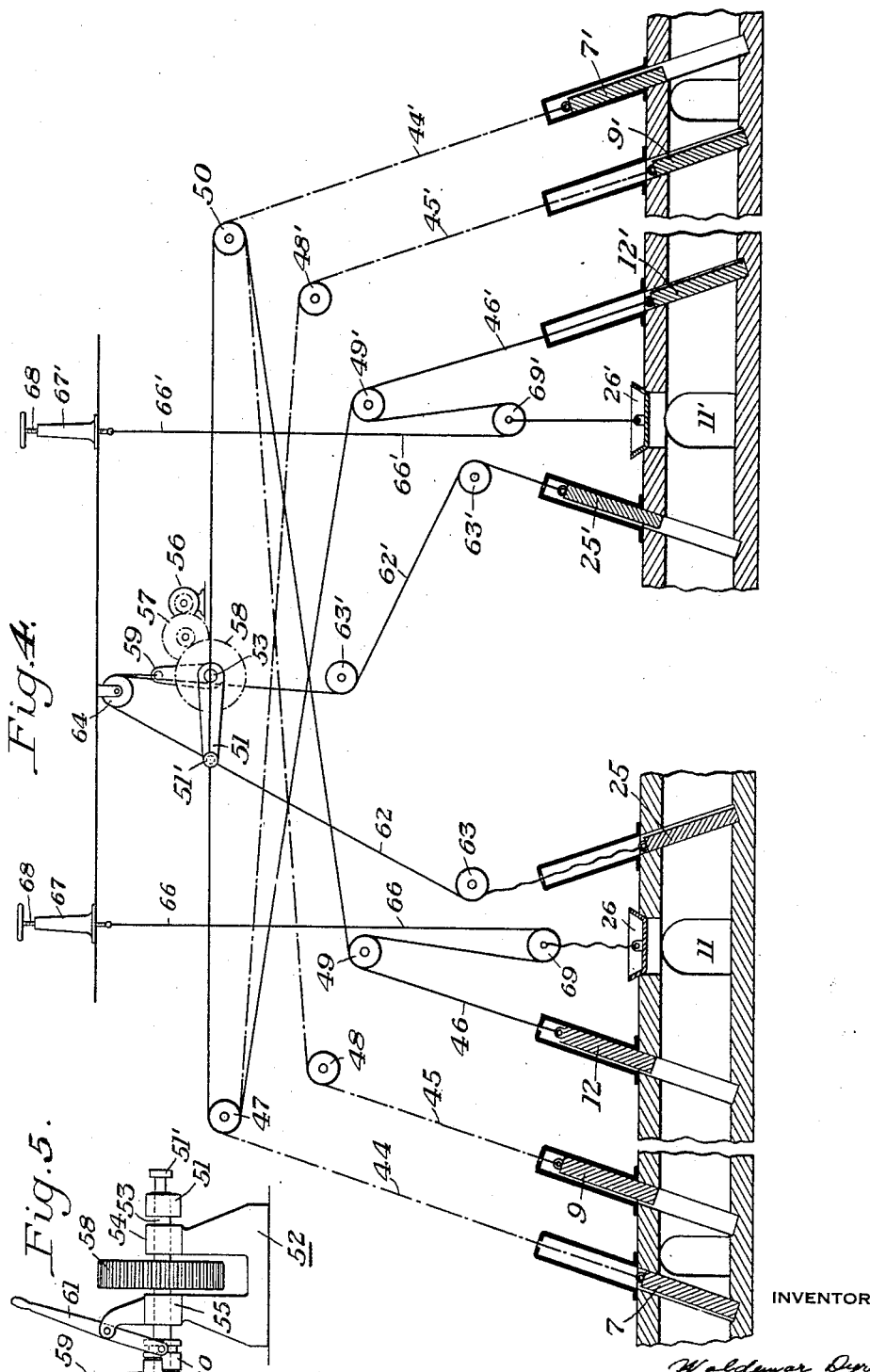

Patented June 23, 1931

1,811,459

UNITED STATES PATENT OFFICE

WALDEMAR DYRSSEN, OF SHARPSBURG, PENNSYLVANIA, ASSIGNOR TO BLAW-KNOX COMPANY, OF BLAWNOX, PENNSYLVANIA, A CORPORATION OF NEW JERSEY

REGENERATIVE HEATING SYSTEM

Application filed May 1, 1928. Serial No. 274,221.

This invention relates to a regenerative heating system.

An important object of the invention is to provide a system of the character referred to which is provided with a preheater or recuperator which may be cut into and out from the heating system at the will of the operator during a heating cycle.

Another object of the invention is to provide a regenerative heating system which has increased efficiency over heating systems heretofore available.

A further object of the invention is to provide a heating system of the type above referred to which has increased flexibility over heating systems now in use.

A still further object of the invention is to provide a heating system comprising a preheater or recuperator which may conveniently be added, with very little labor and at small expense, to heating systems now in use.

Other advantages and objects of the invention will become apparent from the following description.

By "regenerative furnaces" I mean that type of furnace in which the waste gases leaving the melting or heating chambers are passed through so-called checkers, wherein the gases give up part of their heat to bricks with which the checker chambers are filled. After a certain period of time, say about twenty minutes, the flow of gases in the furnace system is reversed so that the air which is used for combustion enters the checker chamber which has been previously heated by the out flowing waste gases of the previous step. In passing through the checker chambers, the air is heated before it comes in contact with the fuel at the entrance of the melting chamber. Upon reverse, the waste gases pass out from the heating chamber at the opposite end of the melting furnace to pass to other checker chambers where they again give up part of their heat.

A regenerative furnace, therefore, consists of at least one pair of checker chambers, which are alternately used for absorbing heat from the waste gases and for giving up this heat to the incoming air in order to heat it before it is mixed with the fuel. Regenerative furnaces are quite efficient but there are several practical reasons why in many cases it is not possible to obtain the highest possible efficiency in furnaces of this type. In order to obtain the highest possible efficiency, it would be necessary to make the checker chambers so large that they would not be practical from an economic standpoint. Large checker chambers also increase the radiation loss from the furnace system to such an extent that instead of increasing the efficiency of the system, there may actually be a loss in efficiency.

Checker chambers are capable of heating air to very high temperatures by using waste gases of extremely high temperatures and, in fact, high temperatures can be better reached with checker chambers than with any other means available. The temperture to which air can be heated by employing checker chambers is, however, limited very materially by the temperature at which the air enters the checker chambers. This is due to the fact that checker chambers, as at present constructed, are not efficient in heating air through a wide range of temperatures. In other words, if air instead of entering the checker chambers at atmospheric temperatures is made to enter the checkers at about 1000 to 1200° F., the resultant air temperature at the top of the checker chambers is materially increased.

According to my method of constructing and operating regenerative furnaces, as hereafter more fully described, I heat the combustion air to a relatively low temperature, say to from 1000 to 1200° F., before it enters the checker chambers by passing atmospheric air through a suitable preheater or recuperator. The preheater or recuperator is heated by utilizing the heat in the waste gases leaving the checker chambers. In accomplishing this preliminary heating in the preheater or recuperator, any suitable preheater or recuperator may be employed, but I prefer to use a highly efficient modern metallic air heater constructed in accordance with my Patent No. 1,543,909, issued June 30, 1925, or in accordance with improvements on said heater. Such heaters have proved to be extremely efficient and are adapted for use in my heating system. The further heating of the combustion air to very high temperatures is accomplished in the ordinary checker chambers in the usual way by utilizing the waste gases directly from the melting chamber.

I am aware that combinations of regenerative heating devices and preheaters or recuperators have been heretofore proposed both for open hearth furnaces and for so-called "blast furnace stoves" which also operate according to the regenerative principle. I know also that there are actual installations of preheaters in connection with blast furnace stoves in operation in Europe. I therefore do not claim the broad idea of employing a preheater or recuperator in connection with regenerative systems, but do claim a new arrangement of preheaters or recuperators in connection with regenerative systems.

In accordance with my invention, the preheater is arranged in such a way that it is not necessary to operate the preheater at all times during which the regenerative heating system is in operation, but on the contrary, the regenerative heating system is so arranged that it can operate in the usual way without a preheater, or it may be used with a preheater. By the arrangement hereinafter more fully described, the preheater may be cut into and taken out from the regenerative system in a few seconds time by merely throwing a lever or starting a motor, or by some other simple device. With such an installation it is possible to cut the preheater in and out of service in a few seconds time, at the will of the operator.

In my system the preheater is installed in such a way that the heating capacity of the preheater can be utilized to any extent that may be desirable. In this way, instead of heating the air to temperatures of from 1000 to 1200° F., as above mentioned, I can so operate the preheater that the air will be at a temperature of say about 600° F. as it enters the checker chambers.

According to one embodiment of my invention, an air fan is installed in the system and delivers atmospheric air to the preheater so that the air passing through the preheater and into the checker chambers is under the control of the operator. An exhauster is employed which draws the necessary amount of waste gases coming from the checker chambers to the preheater so that the amount of waste gases passing through the preheater also is under the control of the operator. The air fan and exhauster above mentioned are preferably driven by the same motor, the speed of which is under the control of the operator so that the proportion of waste gases and air passing through the preheater will be maintained at the same ratio.

I also employ the cooled waste gases from the exhauster to increase the stack draught by introducing the cooled waste gases from the exhauster in the stack flue or in the stack in such a way that they have an aspirating effect on that part of the gases which passes directly from the checker chambers to the stack, thereby increasing the available stack draught.

In melting steel, for example, in an open hearth furnace, the melting operation may be divided roughly into two periods, which are: first, the melting down period; and second, the refining period. During the melting down period the charge of material, usually comprising steel scrap, pig iron, limestone and ore, is introduced into the furnace and the charge melted. After the melting down step has been accomplished, the molten metal is maintained at a high temperature in order to thoroughly refine the metal and to render it of a homogeneous character. It is evident that during the melting down period the melting chamber is relatively cool, and that the waste gases leaving the melting chamber during this period, therefore, also are relatively cool. Because the waste gases leaving the furnace during the melting down period are relatively cool, they heat the checker chambers only to a relatively slight degree, so that upon reversal of the valves, the combustion air entering the checker chambers is only heated to a slight degree. In the ordinary regenerative heating system, the period during which a large amount of heat is needed in order to accomplish the melting of the charge is the melting down period. However, in the ordinary regenerative heating system this is the period in which the checker chambers are relatively cool so that the incoming air is not heated to a high temperature. In other words, in the ordinary regenerative heating system, during the time when the greatest amount of heat is desired, the system is only capable of furnishing a relatively small amount of heat to the incoming combustion air.

During the refining period, the molten metal is maintained at a very high temperature, say at a temperature of about 2800° F. During this refining period, the waste gases delivered to the checker chambers are at such a high temperature that there is some danger of melting the checker work in the chambers. The danger of melting the checker work in the checker chambers would, therefore, be increased with a preheater added to a regenerative heating system in such a manner that it would not be possible to cut out the preheater during the refining period.

In the practice of my invention, I therefore utilize a preheater in connection with the usual checker chambers of a regenerative heating system during the melting down period, but cut out the preheater during the refining period when the checker chambers themselves are at such a high temperature that it is not necessary to employ a preheater.

My invention, therefore, contemplates a regenerative heating system or combination of preheater and regenerative furnace, equipped with checkers whereby heated gases emerging from the checkers on the way to the stack may be either wholly or in part by-passed through the preheater and in cases where only a portion of the waste gases are by-passed through the heater, the gases not by-passed have an unobstructed flow to the stack.

In the accompanying drawings, which illustrate several preferred embodiments of my invention, Figure 1 is a diagrammatic plan view of the regenerative heating system of my invention;

Figure 2 is a view in cross-section, taken on the line II—II of Figure 1;

Figure 4 is a schematic showing of the valves and valve operating mechanism; and Figure 5 is a detail view of a portion of the valve operating mechanism.

Figure 3:
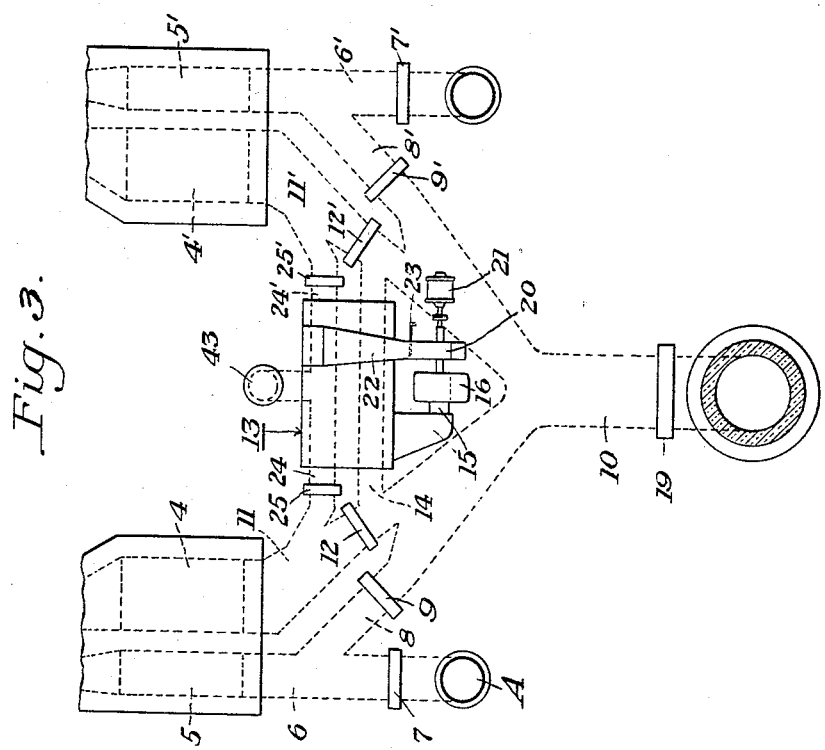
Figure 3 is a view similar to Figure 1 but showing a different system of valves for operating the regenerative system.

In the illustrated embodiment of the invention shown in Figures 1 and 2, an open hearth furnace 1, of the usual type, is provided with air slag pockets 2 and 2', gas slag pockets 3 and 3', air checker chambers 4 and 4', and gas checker chambers 5 and 5'. Gas flues 6 and 6', provided with dampers 7 and 7', are adapted to supply gaseous fuel admitted into the conduit A to the gas checker chambers and thence to the open hearth furnace. Flues 8 and 8' controlled by dampers 9 and 9' connect flues 6 and 6' with a stack flue 10. Flues 11 and 11' controlled by dampers 12 and 12' connect the air checker chambers with stack flue 10. A preheater, designated generally by the numeral 13, is arranged as shown in Figure 1 and is provided with flues 14 and 14' through which the waste gases from flue 10 are admitted into the bottom of the preheater.

The waste gases admitted into the preheater through the flue 14 pass through the preheater through flue 15 and into an exhauster 16 from which they are delivered to an aspirator 17, which discharges the cooled waste heat gases from the preheater into the flue 10 and thence into a stack 18. A damper 19, adapted to control the flow of cooled waste heat gases from the preheater, is arranged in the flue 10. The preheater 13 is provided with a fan 20, driven by a motor 21. A conduit 22, in which is arranged a damper 23, leads the atmospheric air drawn into the fan 20 into the top of the preheater. The air heated in the preheater is delivered from the preheater through flue 24', controlled by a damper 25'. Mushroom valves 26 and 26' are arranged in the flues 11 and 11'. These mushroom valves are for the purpose of delivering atmospheric air to the air checker chambers 4 and 4', but are open to the air only when the preheater 13 is not in use.

Referring particularly to Figure 2, the preheater, shown diagrammatically as at 13, is connected to the aspirator 17 by flues 15 and 28. A damper 29 is arranged in the flue 28 and is adapted to control the flow of waste gas from the preheater into the stack. The waste gas from the air checkers 4 and gas checkers 5 flows into the flue 10 and from there is delivered into the preheater through the conduit 14. After flowing through the preheater and giving up part of its heat to atmospheric air introduced into the preheater, the waste heat gases pass out of the preheater through flues 15 and 28, controlled by damper 29, and are delivered from the aspirator 17 into flue 10 leading to the stack 18.

The passage of gases in the flue 10 is controlled by the damper 19. Atmospheric air is delivered into the preheater 13 through flue 22, shown in Figure 1, and is delivered from the preheater into the flue 24' from whence it flows into air checker chamber 4'.

In the modification shown in Figure 3, a different arrangement of air inlet valves is employed. In this modification there are no mushroom valves 26 and 26' such as shown in Figure 1. Instead of these mushroom valves a valve 43 is provided which connects with the hot air flues 24 and 24' arranged underneath the preheater 13.

By opening the valve 43, atmospheric air is admitted into flues 24 and 24' and is delivered from these flues either to the left hand or right hand side of the furnace by manipulating the dampers 25 and 25'. In this installation the valves 25 and 25' are operated by the valve operating mechanism, hereafter more fully described, at all times. With this modification, the clutch arrangement shown in Figure 5 is not employed, and when it is desired to run the preheater, the valve 43 is closed and the motor 21 is started. Atmospheric air is thus admitted into the preheater through the flue 22, as described in connection with the arrangement shown in Figure 1. It also is possible to open the valve 43 at the same time that the fan 20 is blowing air through the heater, and if the suction effect of the furnace is sufficient, a mixture of cold and hot air will enter the air checkers through the valves 25 and 25'.

In the arrangement shown in Figure 3, the exhauster 16 is shown discharging cooled gases directly to the atmosphere instead of into the stack flue 10. This method of discharging the cooled gases from the heater is simpler when it is not desired to increase the available stack draught by employing the apparatus shown in Figures 1 and 2, in which the aspirator 17 is employed.

In Figures 4 and 5, the valve and valve operating mechanism therefor are indicated diagrammatically. As shown, dampers 7 and 7', 9 and 9', 12 and 12', are connected by cables 44, 45 and 46 and pulleys 47, 48, 49 and 50 to the end 51' of a crank 51 operated by the valve operating mechanism designated generally as at 52. This valve operating mechanism comprises a main shaft 53, supported in bearings 54 and 55. Connected with the main shaft 53 is the crank arm 51. The main shaft 53 is rotated by means of a motor 56, intermediate gear 57, and gear 58 connected to the main shaft 53. The crank 51, to which the valves 7 and 7', 9 and 9', 12 and 12' are connected, rotates at all times while the motor 56 is in operation. The main shaft 53 of the valve operating mechanism is further provided with a crank 59, loosely mounted on the main shaft and adapted to either be connected with the main shaft or disconnected therefrom by means of a clutch 60 actuated by clutch operating lever 61. Valves 25 and 25' are connected by cables 62 and 62', pulleys 63 and 63', and pulley 64, to an arm 65 on the outer end of the crank 59. As shown in Figure 4, a certain amount of slack is provided in the cable 62. The mushroom valves 26 and 26' are actuated by means of cables 66 and 66' connected at their upper ends to floor stands 67 and 67'. These floor stands are so constructed that by turning the screws 68, the pulleys 69 and 69' may be either raised or lowered.

As previously referred to, in employing the apparatus shown in Figures 1 and 2, if the preheater is connected to the heating system it is necessary that the valves 25 and 25' be reversed at each reversal of the system. When the preheater is employed in the device as shown in Figures 1 and 2, it is therefore necessary that the clutch 60, shown in Figure 5, be in a position so as to connect the crank 59 with the main shaft 53 of the valve operating mechanism. However, when the preheater is not connected to the system, it is not necessary to open and close the valves 25 and 25' and the valve actuating mechanism shown in Figure 5 is therefore in a position such that the crank 59 is not connected to the main shaft 53.

In employing the apparatus shown in Figure 3 wherein no mushroom valves, such as indicated at 26 and 26' in Figure 1, are employed, no clutch mechanism, such as shown in Figure 5, is employed, but the crank 59 is always connected to the main shaft 53 of the valve operating mechanism. In the arrangement shown in Figure 3, whether the preheater is connected to the heating system or whether it is disconnected, it is necessary that the valves 25 and 25' be reversed at each reversal of the heating system. The valves 25 and 25', therefore, must be operated each time the valves such as 7, 9 and 12 of the heating system are operated, and there is therefore no necessity of employing the clutch mechanism shown in Figure 5. In the arrangement shown in Figure 3, if it is desired to connect the preheater with the heating system, it is only necessary to start the motor 21 and to either entirely or partially close the valve 43.

From the above description it will be seen that I have provided a regenerative heating system in combination with a preheater, which results in a very flexible system and in which the preheater may either be employed in order to furnish additional heat to the system, or may be disconnected from the system when additional heat is not needed. For instance, supposing that the heating system is operating in the usual way without employing the preheater and it is desired to raise the temperature in the melting furnace, it is obvious that even if the proportions of air and fuel admitted to the furnace are maintained exactly the same, but the preheater is connected to the heating system, the regulation of the valves so that all, or a portion of the incoming air passes through the preheater, causes an increase in temperature in the furnace. This increase in temperature in the furnace depends upon the amount of heat abstracted from the out-flowing waste gases by the heater, and this abstraction of heat from the waste gases by the heater depends upon the amount of such waste gases passing through the heater. The amount of waste gases passing through the heater, for a given position of the valves, depends upon the speed and capacity of the fan employed in connection with the preheater. Therefore, by regulating the speed and capacity of the fan driving hot waste gases through the preheater and by regulating the position of the valves controlling the passage of waste gases through the preheater, the amount of heat taken from the waste gases and, consequently, the increase of temperature in the furnace, can be governed.

The particular arrangement of the valves shown in the several preferred embodiments of the invention is not essential to carrying out my invention. Any suitable arrangement of valves may be employed, the principal feature of my invention being to provide the combination of a regenerative heating system and a preheater or recuperator in such a manner that either all, or a part, of the waste heating gases coming from the checker chambers may be passed through the preheater before being delivered to the stack.

It is to be understood that I have described in detail several preferred embodiments of my invention, but that the invention is not so limited, but may be modified within the scope of the following claims.

I claim:—

1. The combination with a regenerative heating system, of a preheater, an exhauster for causing a regulable portion of the waste heat gases from the system to pass through the preheater, a fan for introducing cool air into the preheater, and means for delivering heated air from the preheater to the heating system, said exhauster and fan being operably connected together.

2. The combination with a regenerative heating system, of a preheater, an exhauster for causing a regulable portion of the waste heat gases from the system to pass through the preheater, an aspirator adapted to increase the stack draught connected with said exhauster, a fan for introducing cool air into the preheater, and means for delivering heated air from the preheater to the heating system, said exhauster and fan being operably connected together.

3. The combination with a regenerative heating system provided with an air checker chamber and a gas checker chamber, a stack, and flues connecting said chambers with said stack, of a preheater, an exhauster associated with the preheater adapted to cause a regulable portion of the waste heat gases from the system to pass through the preheater, a fan adapted to deliver cool air to the preheater in order to raise its temperature, means for delivering the heated air to the system including a flue provided with a damper, and means for introducing atmospheric air into said last named flue.

4. The combination with a regenerative heating system including an air checker chamber and a gas checker chamber, a stack, and flues connecting said chambers with said stack, of a preheater, an exhauster adapted to cause a portion only of the waste heat gases from the heating system to flow through the preheater, a fan associated with the preheater and adapted to deliver relatively cool air to the preheater in order to raise its temperature, an aspirator connected with the exhauster and adapted to increase the stack draught, and a flue provided with a damper and a mushroom valve connecting the preheater with the air checker chamber, said exhauster and said fan being operably connected.

5. The combination with a regenerative heating system including a checker chamber, of a preheater for the regenerative heating system, and means for passing a regulable portion of the waste gases from the checker chamber through the preheater.

6. The combination with a regenerative heating system including a checker chamber, of a preheater, means for passing a regulable portion of the waste gases from the checker chamber through the preheater, means for passing a regulable amount of air through the preheater to raise its temperature, and means for delivering the heated air to the system.

7. The combination with a regenerative heating system, of a preheater, means for passing a regulable portion of the waste heat gases from the system through the preheater, means for passing air through the preheater to raise its temperature, and means for delivering the heated air to the system.

8. The combination with a regenerative heating system, of a preheater, a stack, means for dividing the waste heat gases from the system into a plurality of streams, means for passing one stream through the preheater, means for passing another stream to the stack, means for passing air through the preheater to raise its temperature, and means for delivering the heated air to the system.

In testimony whereof I have hereunto set my hand.

WALDEMAR DYRSSEN.